April 24, 1928.  1,666,947
H. C. SILENT
METHOD OF AND MEANS FOR REDUCING BODY CAPACITY EFFECTS ON LOOP ANTENNA SYSTEMS
Filed Dec. 31, 1924

INVENTOR
*H. C. Silent*
BY
ATTORNEY

Patented Apr. 24, 1928.

1,666,947

UNITED STATES PATENT OFFICE.

HAROLD C. SILENT, OF BROOKLYN, NEW YORK, ASSIGNOR TO AMERICAN TELEPHONE AND TELEGRAPH COMPANY, A CORPORATION OF NEW YORK.

METHOD OF AND MEANS FOR REDUCING BODY-CAPACITY EFFECTS ON LOOP-ANTENNA SYSTEMS.

Application filed December 31, 1924. Serial No. 759,095.

This invention relates to loop antennæ, and more particularly to loop antennæ in which is employed the balanced type of loop.

It has been the practice in connection with loop antennæ—taking the frame or helical type of balanced loop as an illustration—to place the outer turns at high potential and connect them to the receiving circuits or the measuring set, as the case may be, and to connect the inner turns to ground. With such connections it has been found that the effect of the body capacity of the operator and the capacity effects of objects near the antenna are great.

The object of applicant's invention is the material reduction of these undesirable body capacity effects of the operator and nearby objects.

Applicant accomplishes such reduction of body capacity effects by winding and connecting the loop or loops in a novel manner, thereby making the antenna to a very high degree self-shielding.

Figure 1:
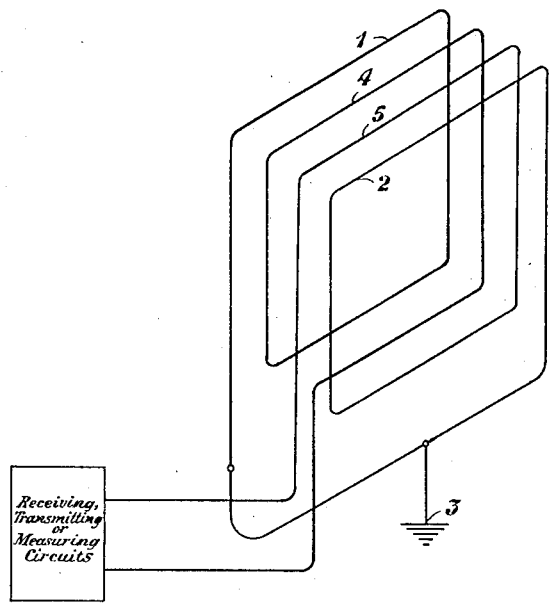
Figure 2:
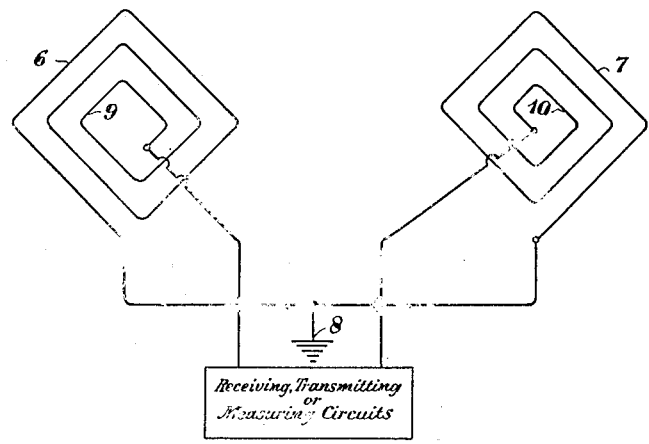

The invention will be clearly understood from the following description of the winding and connections when the same is read with reference to the accompanying drawing. Figure 1 of the drawing shows diagrammatically a loop antenna of the frame or helical type, wound and connected according to applicant's invention, while Fig. 2 shows in like manner a flat type of loop antenna. It is to be understood that the improved antenna may be used not only with receiving sets but also with transmitting sets and with other apparatus such as measuring sets.

With reference to the details of the drawing, and first with particular reference to Fig. 1, which shows the frame or helical type, the loop is wound from the outside inward, and the outer turns 1 and 2 are placed at ground potential, being strapped and grounded at 3. The inner turns 4 and 5 are placed at high potential and are connected to the receiving circuits or measuring apparatus, as indicated. Turns 4 and 5 may or may not be connected metallically at their terminals. This arrangement renders the antenna self-shielding to a very high degree and, consequently, results in a material reduction of the body capacity effects.

Fig. 2 shows the winding and connections of the loop of a flat type antenna. The outer winding 6 of the first loop and the outer winding 7 of the second loop are strapped and grounded at 8, while the inner windings 9 and 10 of the first and second loops respectively are connected to the receiving circuits or measuring apparatus. Turns 9 and 10 may or may not be connected metallically at their terminals. The effects and advantages are the same as those in the case of the frame type loop.

It is to be understood, in connection with the foregoing description and with the claims, that when the word "ground" or the word "grounded" is used, it is not meant that the connection must necessarily be to the actual earth. Either term indicates either actual grounding or an electrical connection to such point in the associated electrical system that at the point of connection a voltage node (or current loop) will be formed in the loop system.

It is to be understood that applicant does not necessarily limit himself to the disclosure of the drawing, which serves the purpose of illustration, but claims the following methods and means of attaining the desired result.

What is claimed is:

1. The method of reducing body capacity effects in a balanced loop antenna system including a plurality of turns, which consists in placing the outer loop turns at ground potential and the inner loops turns at high potential and connecting the inner turns to the apparatus served by the antenna.

2. The method of rendering a balanced loop antenna, including a plurality of turns, self-shielding against body capacity effects, which consists in placing the outer loop turns at ground potential and the inner loop turns at high potential and connecting the inner turns to the apparatus served by the antenna.

3. A loop antenna including a plurality of turns and having its outer turns connected to ground and its inner turns connected to the apparatus served by the antenna.

4. A loop antenna including a plurality of turns and having its outer turns at ground potential and its inner turns at high potential, said inner turns being connected to the apparatus served by the antenna.

5. A loop antenna including a plurality of turns and having its outer turns at ground potential and its inner turns at high potential, said outer turns being strapped and connected to ground and said inner turns being connected to the apparatus served by the antenna.

In testimony whereof, I have signed my name to this specification this 30th day of December 1924.

HAROLD C. SILENT.